US012718788B2

(12) United States Patent
Vempati et al.

(10) Patent No.: US 12,718,788 B2
(45) Date of Patent: Aug. 25, 2026

(54) MACHINE LEARNING (ML) ALGORITHM FOR SOUND CLASSIFICATION AND CANCELLATION

(71) Applicant: QUALCOMM Incorporated, San Diego, CA (US)

(72) Inventors: Sri Vatsava Ganesh Kumar Vempati, Nellore (IN); Hitesh Venkata Rachakonda, Hyderabad (IN); Vasavi Kandikattu, Nellore (IN); Sridhar Rao Nune, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 18/590,667

(22) Filed: Feb. 28, 2024

(65) Prior Publication Data

US 2025/0273191 A1 Aug. 28, 2025

(51) Int. Cl.
*G10K 11/178* (2006.01)

(52) U.S. Cl.
CPC ................................ *G10K 11/1785* (2018.01)

(58) Field of Classification Search
CPC ................................................. G10K 11/1785
USPC ........................................................ 381/71.1
See application file for complete search history.

(56) References Cited

U.S. PATENT DOCUMENTS 9,398,367 B1 7/2016 Scott et al.
10,685,639 B2 * 6/2020 Tzanetos .......... G10K 11/17857
11,315,541 B1 4/2022 Lovitt et al.
12,243,508 B1 * 3/2025 Jain .................. G10K 11/17883
2016/0125869 A1 5/2016 Kulavik et al.
2018/0336000 A1 11/2018 Vaughn et al.
2020/0090644 A1 * 3/2020 Klingler ............... G06N 3/0499
2020/0220511 A1 * 7/2020 Shaya .................... G06N 3/092
2020/0302909 A1 9/2020 Volmer et al.
2020/0380945 A1 12/2020 Woodruff et al.
2021/0400373 A1 12/2021 Marti et al.
2022/0020386 A1 * 1/2022 Vanapalli ............ G10L 21/0208
2023/0019110 A1 1/2023 Lee
2023/0209283 A1 * 6/2023 Wagner ................ H04R 25/606 381/312
2023/0335101 A1 10/2023 Zhang et al.

FOREIGN PATENT DOCUMENTS

WO WO-2024254467 A2 * 12/2024 ........... H04R 1/1083

OTHER PUBLICATIONS

International Search Report and Written Opinion—CT/US2025/017237—ISA/EPO—Apr. 14, 2025 (2309071WO).

* cited by examiner

*Primary Examiner* — David L Ton
(74) *Attorney, Agent, or Firm* — QUALCOMM Incorporated; Espartaco Diaz Hidalgo

(57) ABSTRACT

This disclosure provides systems, methods, and devices for audio signal processing that support noise cancellation. In a first aspect, a method of signal processing includes determining a location of the apparatus; receiving an audio signal including sounds at the location of the apparatus; determining, based on a machine learning (ML) model, to reduce a presence of the one or more sounds in the audio signal based on the location; and determining an output audio signal by reducing the presence of the one or more sounds in the audio signal. Other aspects and features are also claimed and described.

20 Claims, 7 Drawing Sheets

MACHINE LEARNING (ML) ALGORITHM FOR SOUND CLASSIFICATION AND CANCELLATION

TECHNICAL FIELD

Aspects of the present disclosure relate generally to audio signal processing, and more particularly, to noise cancellation. Some features may enable and provide improved audio quality by remove undesirable sounds through the noise cancellation.

INTRODUCTION

Multimedia devices are devices that can reproduce one or more audio and/or video signals, whether digital or analog signals. Multimedia functionality can be incorporated into a wide variety of devices. By way of example, multimedia devices may comprise stand-alone audio devices, mobile telephones, cellular or satellite radio telephones, personal digital assistants (PDAs), panels or tablets, gaming devices, or computing devices. Multimedia devices are frequently being used in noisy environments, and those noisy environments can distract the user from hearing the desired sounds in the multimedia content produced by the multimedia device.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, sounds in an environment are classified by a machine learning (ML) algorithm as desired signals to be passed through to a user or as undesired signals to be cancelled based on detection of certain sounds at a particular location. Sounds in an environment may be evaluated by a machine learning (ML) algorithm to determine for each of the recognized sounds which sounds should be cancelled to avoid distracting the user and which sounds should be heard by the user because of the potentially relevant content to the user. The ML algorithm in aspects of this disclosure recognizes the sounds and determines the relevance of the sounds to the user based on the user's location.

The removal of the undesired sounds may be performed, in some embodiments, by controlling an active noise cancellation (ANC) system to remove the undesired sounds. Active noise cancellation (ANC, also called active noise reduction) is a technology that actively reduces ambient acoustic noise by generating a waveform that is an inverse form of the noise wave (e.g., having the same level and an inverted phase), also called an "antiphase" or "anti-noise" waveform. ANC uses one or more microphones to pick up an external noise reference signal, generates an anti-noise waveform from the noise reference signal, and reproduces the anti-noise waveform through one or more loudspeakers. This anti-noise waveform interferes destructively with the original noise wave to reduce the level of the noise that reaches the ear of the user. The ANC system may be controlled to generate anti-noise waveforms specific to the undesired sounds.

The ML algorithm may detect the location of the person through a global navigation satellite system (GNSS) of the multimedia device or a GNSS coupled to the multimedia device. Based on the location, the ML algorithm may detect the different types of sounds in the environment of the user of the multimedia device. The ML algorithm may send a notification to the user of the multimedia device indicating the sounds detected, allowing the user to identify whether the sounds are relevant to the user or not. The ML algorithm learns from the user input which sounds are relevant to the user at their location. Sounds that are detected by the ML algorithm at the location are then cancelled or not cancelled based on the user training. Cancellation may be performed by generating a reverse audio wave that cancels the sound when the reverse audio wave is summed with the microphone audio signal.

In one example application, aspects of the disclosure may be used to perform cancellation of sounds at a transit center. The location may be determine either with a global positioning system (GPS) module in earpods in wireless communication with the multimedia device or through a GPS module in the multimedia module. The ML algorithm detects types of sounds in the environment at the user's location. The multimedia device notifies the user who is waiting for a train. If the user wants to hear only the announcements particular to the user's train, such as sounds regarding a train with route identifier number "12711," the user chooses that particular sound to classify as a desirable sound. The ML model may control an ANC algorithm and/or other noise masking filter algorithms to filter out undesirable sounds and only allow desirable sounds regarding a notification of route "12711" are output to the user.

The detection by the ML model of the desirable sounds may also trigger other functionality within the multimedia device. For example, when a desirable sound is determined and passed to the user's output device (e.g., earpods, headphones, speaker), the ongoing multimedia playback will pause for a moment and restart only when the desirable sound completes. As another example, a notification (e.g., a text message or push notification) may also be sent to the user on the multimedia device regarding the announcement of the train "12711."

The ML model-based noise cancellation as trained by a user to identify and cancel sounds that are specifically relevant to the user improves the operation of the multimedia device for the user. The use of wireless earpods and other multimedia devices has become a regular practice for users during their daily routine and in a public gathering places like supermarkets, transit centers (e.g., metro stations, bus stops, or railway stations), and stores. The ML model-based noise cancellation allows such a user to avoid missing any communication relevant to the user (e.g., the user's own train/flight) while continuing multimedia playback (e.g., a telephone call for an important discussion, safety alerts for important notifications regarding weather, or multimedia content such as music, movies, or other audio content).

In one aspect of the disclosure, a method for signal processing includes determining a location of a multimedia device; receiving an audio signal including sounds at the location of the multimedia device; determining, based on a machine learning (ML) model, to reduce a presence of one or more sounds in the audio signal based on the location; and determining an output audio signal by reducing the presence of the one or more sounds in the audio signal.

In an additional aspect of the disclosure, an apparatus includes a memory configured to store an audio signal and one or more processors coupled to the memory. The one or more processors are configured to determine a location of the apparatus; receive the audio signal including sounds at the location of the apparatus; determine, based on a machine learning (ML) model, to reduce a presence of one or more sounds in the audio signal based on the location; and determine an output audio signal by reducing the presence of the one or more sounds in the audio signal.

In an additional aspect of the disclosure, an apparatus includes means for determining a location of a multimedia device; means for receiving an audio signal including sounds at the location of the multimedia device; means for determining, based on a machine learning (ML) model, to reduce a presence of one or more sounds in the audio signal based on the location; and means for determining an output audio signal by reducing the presence of the one or more sounds in the audio signal.

In an additional aspect of the disclosure, a non-transitory computer-readable medium stores instructions that, when executed by at least one processor, cause the processor to perform operations. The operations include determining a location of a multimedia device; receiving an audio signal including sounds at the location of the multimedia device; determining, based on a machine learning (ML) model, to reduce a presence of one or more sounds in the audio signal based on the location; and determining an output audio signal by reducing the presence of the one or more sounds in the audio signal.

Methods of audio signal processing described herein may be performed by a signal processing device. The audio signal processing may be applied audio data captured by one or more microphones of the signal processing device. Audio signal processing devices, devices that can playback, record, and/or process one or more audio recordings can be incorporated into a wide variety of devices. By way of example, audio signal processing devices may comprise stand-alone audio devices, such as entertainment devices and personal media players, wireless communication device handsets such as mobile telephones, cellular or satellite radio telephones, personal digital assistants (PDAs), tablets, gaming devices, computing devices such as webcams, video surveillance cameras, or other devices with audio recording or audio capabilities.

The audio signal processing techniques described herein may involve devices having microphones and processing circuitry (e.g., application specific integrated circuits (ASICs), digital signal processors (DSP), graphics processing unit (GPU), or central processing units (CPU)).

In some aspects, a device may include a digital signal processor or a processor (e.g., an application processor) including specific functionality for audio processing. The methods and techniques described herein may be entirely performed by the digital signal processor or the processor, or various operations may be split between the digital signal processor and the processor, and in some aspects split across additional processors. In some embodiments, the methods and techniques disclosed herein may be adapted using input from a neural signal processor (NSP) in which one or more parameters of the signal processing are controlled based on output from a machine learning (ML) model executed by the NSP.

In an additional aspect of the disclosure, a device configured for audio signal processing and/or audio capture is disclosed. The apparatus includes means for recording audio. Example means may include a dynamic microphone, a condenser microphone, a ribbon microphone, a carbon microphone, or a crystal microphone. The microphone may be construed as a microelectromechanical system (MEMS). These components may be controlled to capture first and/or second sound recordings, which may correspond to left and right channels of a recording.

For any of these types of microphones, the microphones may include analog and/or digital microphones. Analog microphones provide a sensor signal, which is some embodiments is conditioned or filtered. Analog microphones in a digital system include an external analog-to-digital converter (ADC) to interface with digital circuitry. Digital microphones include the ADC and other digital elements to convert the sensor signal into a digital data stream, such as a pulse-density modulated (PDM) stream or a pulse-code modulated (PCM) stream.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos (with associated or embedded sounds) in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
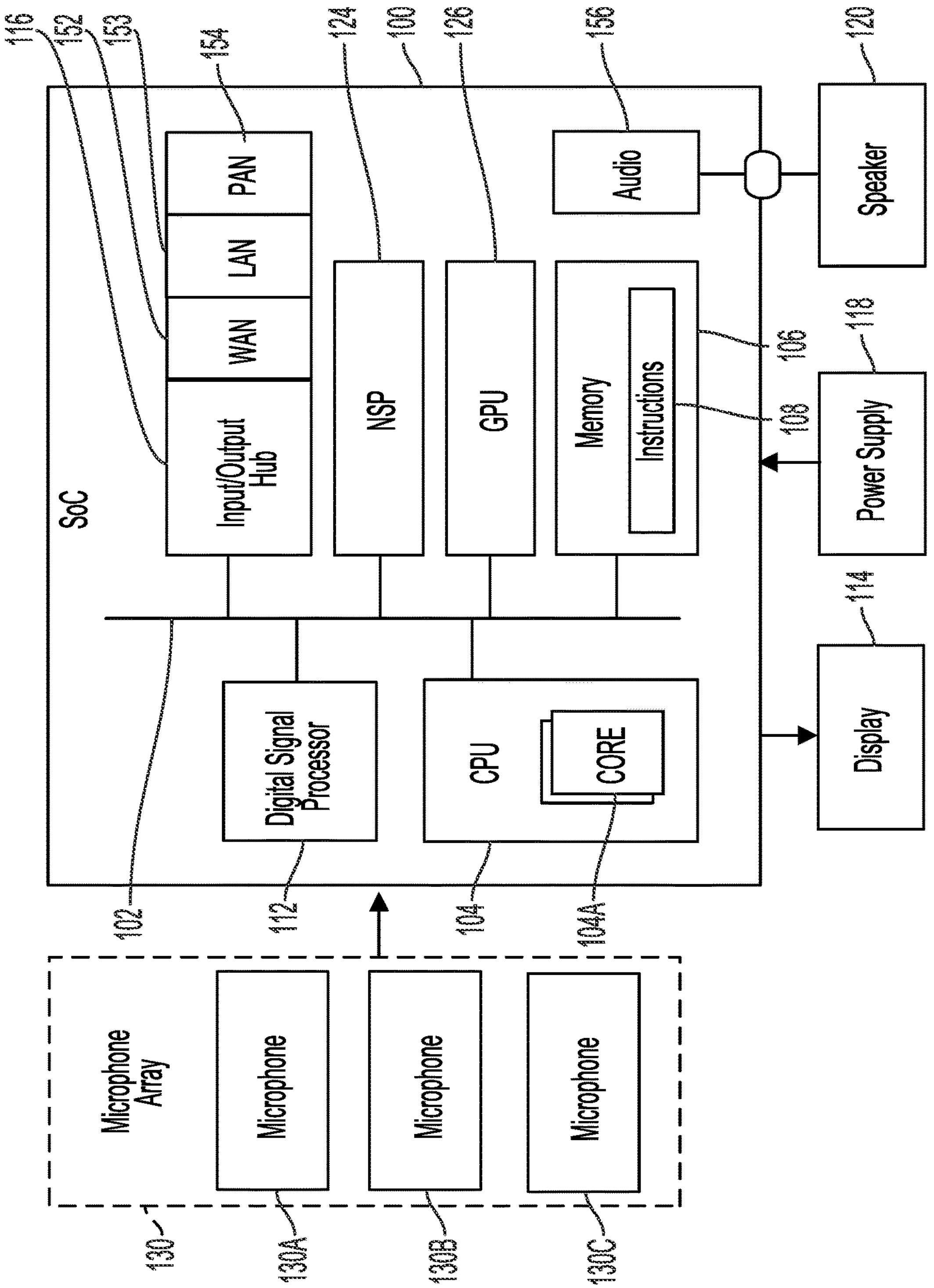
FIG. 1 shows a block diagram of a system-on-chip (SoC) configured for performing signal processing according to one or more aspects of this disclosure.

The present disclosure provides systems, apparatus, methods, and computer-readable media that support signal processing, including techniques for cancelling undesirable sounds in an environment. The cancellation may be performed as part of an active noise cancellation (ANC) system in a multimedia device. Sounds in an environment may be evaluated by a machine learning (ML) algorithm to determine whether to reduce the presence of the sounds through cancellation. The ML algorithm may detect the location of the person through a global navigation satellite system (GNSS) of the multimedia device or a GNSS coupled to the multimedia device. Based on the location, the ML algorithm may detect the different types of sounds in the environment of the user of the multimedia device. The ML algorithm may send a notification to the user of the multimedia device indicating the sounds detected, allowing the user to identify whether the sounds are relevant to the user or not. The ML algorithm learns from the user input which sounds are relevant to the user at their location. Sounds that are detected by the ML algorithm at the location are then cancelled or not cancelled based on the user training. Cancellation may be performed by generating a reverse audio wave that cancels the sound when the reverse audio wave is summed with the microphone audio signal.

Particular implementations of the subject matter described in this disclosure may be implemented to realize one or more of the following potential advantages or benefits. In some aspects, the present disclosure provides techniques for ML model-based noise cancellation as trained by a user to identify and cancel sounds that are specifically relevant to the user improves the operation of the multimedia device for the user. The ML model-based noise cancellation allows a user to avoid missing any communication relevant to the user (e.g., the user's own train/flight) while continuing multimedia playback (e.g., a telephone call for an important discussion, safety alerts for important notifications regarding weather, or multimedia content such as music, movies, or other audio content).

The detailed description set forth below, in connection with the appended drawings to which the text references, is intended as a description of various embodiments and is not intended to limit the scope of the disclosure. Rather, the detailed description includes specific details for the purpose of providing a thorough understanding of the subject matter of this disclosure. It will be apparent to those skilled in the art that these specific details are not required in every case and that, in some instances, well-known structures and components are shown in block diagram form for clarity of presentation.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

An example device for recording sounds and/or processing sound signals using one or more microphones, such as a MEMS microphone, may include a configuration of one, two, three, four, or more microphones at different locations on the device. The example device may include one or more digital signal processors (DSPs), AI engines, or other suitable circuitry for processing signals captured by the microphones. The one or more digital signal processors (DSPs) may output signals representing sounds through a bus for storage in a memory, for reproduction by an audio system, and/or for further processing by other components (such as an applications processor). The processing circuitry may perform further processing, such as for encoding, storage, transmission, or other manipulation of the audio signals. In some embodiments, the example device may include audio circuitry including an audio amplifier (e.g., a class-D amplifier) for driving a transducer to reproduce the sounds represented by the audio signals. A speaker may be integrated with the device and coupled to the audio amplifier to be driven by the audio amplifier for reproducing the sounds. A connection may be provided by a jack or other connector on the device to couple an external transducer (e.g., an external speaker or headphones) to the audio amplifier to be driven by the audio circuitry to reproducing the sounds. In some embodiments, the jack may instead output a digital signal for conversion and amplification by an external device, such as when the jack is configured to be coupled to a digital device through a Universal Serial Bus (USB) Type-C(USB-C) connection and some or all of the audio circuitry is bypassed.

FIG. 1 shows a block diagram of a system-on-chip (SoC) configured for performing signal processing according to one or more aspects of this disclosure. The SoC 100 may include several components coupled together through a bus 102, which may be a network-on-a-chip (NoC) or a plurality of NOCs interconnecting various components. For example, although FIG. 1 illustrates several components coupled to the bus 102, the several components may be coupled to different busses with additional busses connecting the different busses to provide a path for communication between the components.

One example component in the SoC 100 is digital signal processor (DSP) 112 for signal processing. The DSP 112 may process audio signals received from microphones 130A, 130B, and 130C of microphone array 130. The DSP 112 may include hardware customized for performing a limited set of operations on specific kinds of data. For example, a DSP may include transistors coupled together to perform operations on streaming data and use memory architectures and/or access techniques to fetch multiple data or instructions concurrently. Such configurations may allow the DSP 112 to operate on real-time data, such as video data, audio data, or modem data, in a power-efficient manner.

The SoC 100 also includes a central processing unit (CPU) 104 and a memory 106 storing instructions 108 (e.g., a memory storing processor-readable code or a non-transitory computer-readable medium storing instructions) that may be executed by a processor of the SoC 100. The CPU 104 may be a single central processing unit (CPU) or a CPU cluster comprising two or more cores such as core 104A. The CPU 104 may include hardware capable of performing generic operations on many kinds of data, such as hardware capable of executing instructions from the Advanced RISC Machines (ARM®) instruction set, such as ARMv8 and ARMv9. For example, a CPU 104 may include transistors coupled together to perform operations for supporting executing an operating system and user applications (e.g., a camera application, a multimedia application, a gaming application, a productivity application, a messaging application, a videocall application, an audio recording application, a video recording application). The CPU 104 may execute instructions 108 retrieved from the memory 106. In some embodiments, the CPU 104 executing an operating system may coordinate execution of instructions by various components within the SoC 100. For example, the CPU 104 may retrieve instructions 108 from memory 106 and execute the instructions on the DSP 112.

The SoC 100 may further include a neural signal processor (NSP) 124 for executing machine learning (ML) models relating to multimedia applications. The NSP 124 may include hardware configured to perform and accelerate convolution operations involved in executing machine learning algorithms. For example, the NSP 124 may improve performance when executing predictive models such as artificial neural networks (ANNs) (including multilayer feedforward neural networks (MLFFNN), the recurrent neural networks (RNN), and/or the radial basis functions (RBF)). The ANN executed by the NSP 124 may access predefined training weights stored in the memory 106 for performing operations on user data.

The SoC 100 may be coupled to a display 114 for interacting with a user. The SoC 100 may also include a graphics processing unit (GPU) 126 for rendering images on the display 114. In some embodiments, the CPU 104 may perform rendering to the display 114 without a GPU 126. In some embodiments, the GPU 126 may be configured to execute instructions for performing operations unrelated to rendering images, such as for processing large volumes of datasets in parallel.

Processing algorithms, techniques, and methods that are described herein may be executed by at least one processor of the SoC 100, which may include execution by all steps on one of the processors (e.g., DSP 112, CPU 104, NSP 124, GPU 126) or may include execution of steps across a combination of one or more of the processors (e.g., DSP 112, CPU 104, NSP 124, GPU 126). In some embodiments, at least one of the DSP 112, the NSP 124, or the CPU 104 executes instructions to perform various operations described herein, including ML-based removal of certain ambient sounds based on location. For example, execution of the instructions by the CPU 104 as part of a multimedia application (e.g., a voice recorder, a sound recording, or a video recorder) may instruct the DSP 112 to begin or end capturing audio from one or more microphones 130A-C. The operations of the CPU 104 may be based on user input. For example, a voice recorder application executing on CPU 104 may receive a user command to begin a voice recording upon which audio comprising one or more channels is captured and processed for playback and/or storage. Audio processing to determine "output" or "corrected" signals, such as according to techniques described herein, may be applied to one or more segments of audio in the recording sequence.

Input/output components may be coupled to the SoC 100 through an input/output (I/O) hub 116. An example of a hub 116 is an interconnect to a peripheral component interconnect express (PCIe) bus. Example components coupled to hub 116 may be components used for interacting with a user, such as a touch screen interface and/or physical buttons. Some components coupled to hub 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna that may be shared by each of the adaptors 152, 153, and 154, or coupled to multiple antennas configured for primary and diversity reception and/or configured for receiving specific frequency bands. In some embodiments, the WAN adaptor 152, LAN adaptor 153, and/or PAN adaptor 154 may share circuitry, such as portions of a radio frequency front end (RFFE).

Audio circuitry 156 may be integrated in SoC 100 as dedicated circuitry for coupling the SoC 100 to a speaker 120 external to the SoC 100, which may be a transducer such as a speaker (either internal to or external to a device incorporating the SoC 100) or headphones. The audio circuitry 156 may include coder/decoder (CODEC) functionality for processing digital audio signals. The audio circuitry 156 may further include one or more amplifiers (e.g., a class-D amplifier) for driving a transducer coupled to the SoC 100 for outputting sounds generated during execution of applications by the SoC 100. Functionality related to audio signals described herein may be performed by a combination of the audio circuitry 156 and/or other processors of the SoC (e.g., CPU 104, DSP 112, GPU 126, NSP 124).

The SoC 100 may couple to external devices outside the package of the SoC 100. For example, the SoC 100 may be coupled to a power supply 118, such as a battery or an adaptor to couple the SoC 100 to an energy source. The signal processing described herein may be adapted to and achieve power efficiency to support operation of the SoC 100 from a limited-capacity power supply 118 such as a battery. For example, operations may be performed on a portion of the SoC 100 configured for performing the operation at a lowest power consumption. As another example, operations themselves are performed in a manner that reduces an amount of computations to perform the operation, such that the algorithm is optimized for extending the operational time of a device while powered by a limited-capacity power supply 118. In some embodiments, the operations described herein may be configured based on a type of power supply 118 providing energy to the SoC 100. For example, a first set of operations may be executed to perform a function when the power supply 118 is a wall adaptor. As another example, a second set of operations may be executed to perform a function when the power supply 118 is a battery.

The SoC 100 may also include or be coupled to additional features or components that are not shown in FIG. 1. Although components are shown integrated as a single SoC 100, which may include all components built on a single semiconductor die with a common semiconductor substrate, other arrangements of the illustrated blocks different number of dies, substrates, and/or packages may be arranged to accomplish the same functionality described in this disclosure.

The memory 106 may include a non-transient or non-transitory computer readable medium storing computer-executable instructions as instructions 108 to perform all or a portion of one or more operations described in this disclosure. The instructions 108 may include a multimedia application (or other suitable application such as a messaging application) to be executed by the SoC 100 that records, processes, or outputs audio signals. The instructions 108 may also include other applications or programs executed by the SoC 100, such as an operating system and applications other than for multimedia processing.

In addition to instructions 108, the memory 106 may also store audio data. The SoC 100 may be coupled to an external memory and configured to access the memory for writing output audio files for later playback or long-term storage. For example, the SoC 100 may be coupled to a flash storage device comprising NAND memory for storing video files (e.g., MP4-container formatted files) including audio tracks and/or storing audio recordings (e.g., MPEG-1 Layer 3 files, also referred to as MP3 files). Portions of the video or audio files may be transferred to memory 106 for processing by the SoC 100, with the resulting signals after processing encoded as video or audio files in the memory 106 for transfer to the long-term storage.

While the SoC 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components.

The SoC of FIG. 1 may be operated to obtain improved audio recordings and/or improved user experience through higher quality audio playback by applying ML-based noise cancellation based on location of the device. One example method of performing multimedia operations is shown in FIG. 2 and described below.

Figure 2:
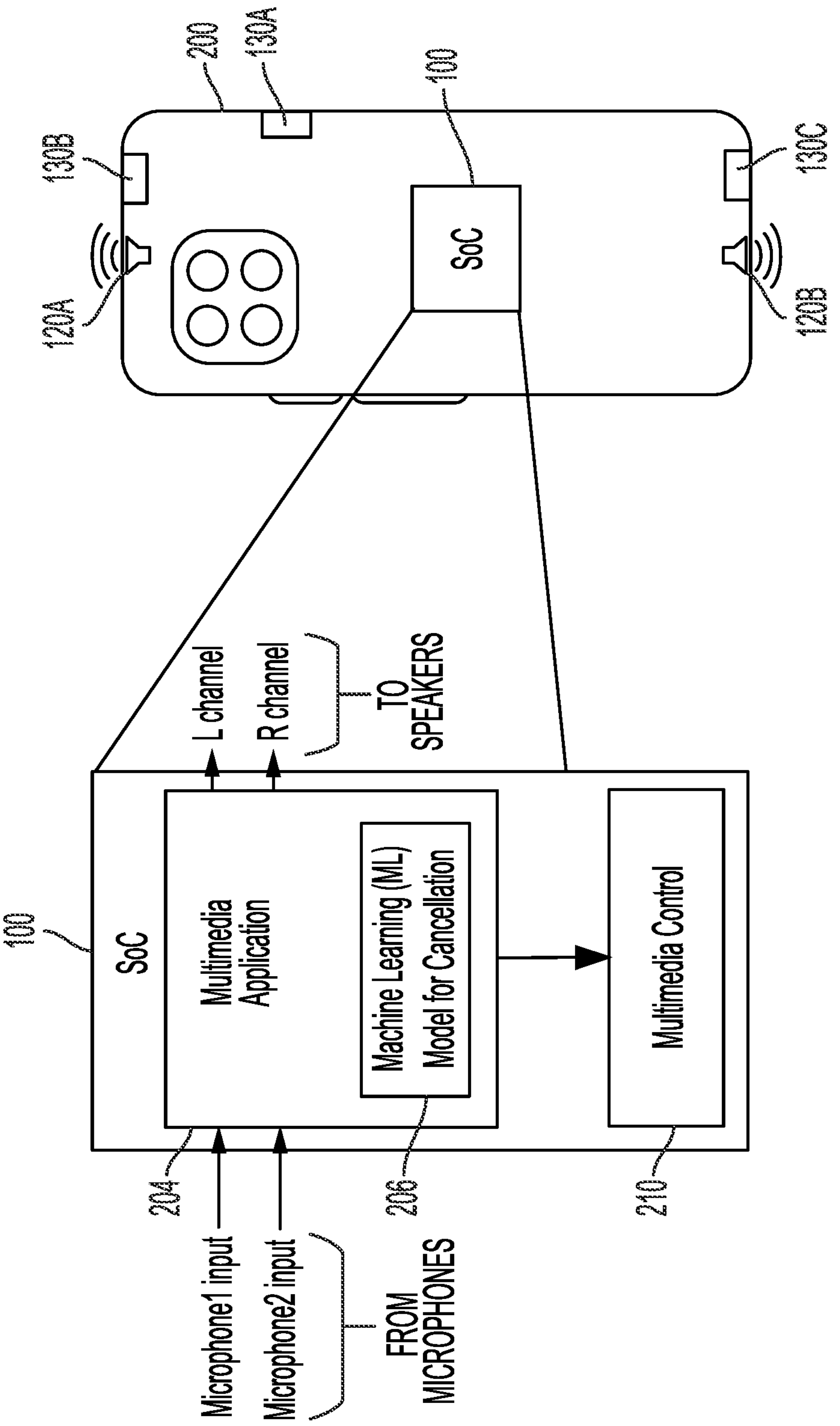
FIG. 2 is a block diagram illustrating an example data flow path for audio signal processing in a multimedia device according to one or more aspects of the disclosure.

FIG. 2 is a block diagram illustrating an example data flow path for audio signal processing in a multimedia device according to one or more aspects of the disclosure. SoC 100 of multimedia device 200 may execute multimedia control 210, such as part of an operating system or driver, to control the capture of sounds from microphones or other audio sources and/or to control the configuration of audio processing circuitry 156. The audio configuration applied by multimedia control 210 to either output devices (e.g., speakers) or input devices (e.g., microphones) may include parameters that specify, for example, a bit depth, a sampling rate, a data rate, a magnitude, or other parameters.

Multimedia control 210 may be managed by or provide services to a multimedia application 204. The multimedia application 204 may also execute on the SoC 100. The multimedia application 204 provides settings accessible to a user such that a user can specify individual playback settings or select a profile with corresponding playback settings. The multimedia application 204 may be, for example, a video recording application, a screen sharing application, a virtual conferencing application, an audio playback application, a messaging application, a video communications application, or other application that processes audio data. The multimedia application 204 may include a machine learning (ML) model 206 for location-based noise cancellation to improve the quality of audio presented to the user during execution of multimedia application 204. The ML model 206 may perform one or more or a combination of the techniques described herein.

Figure 3:
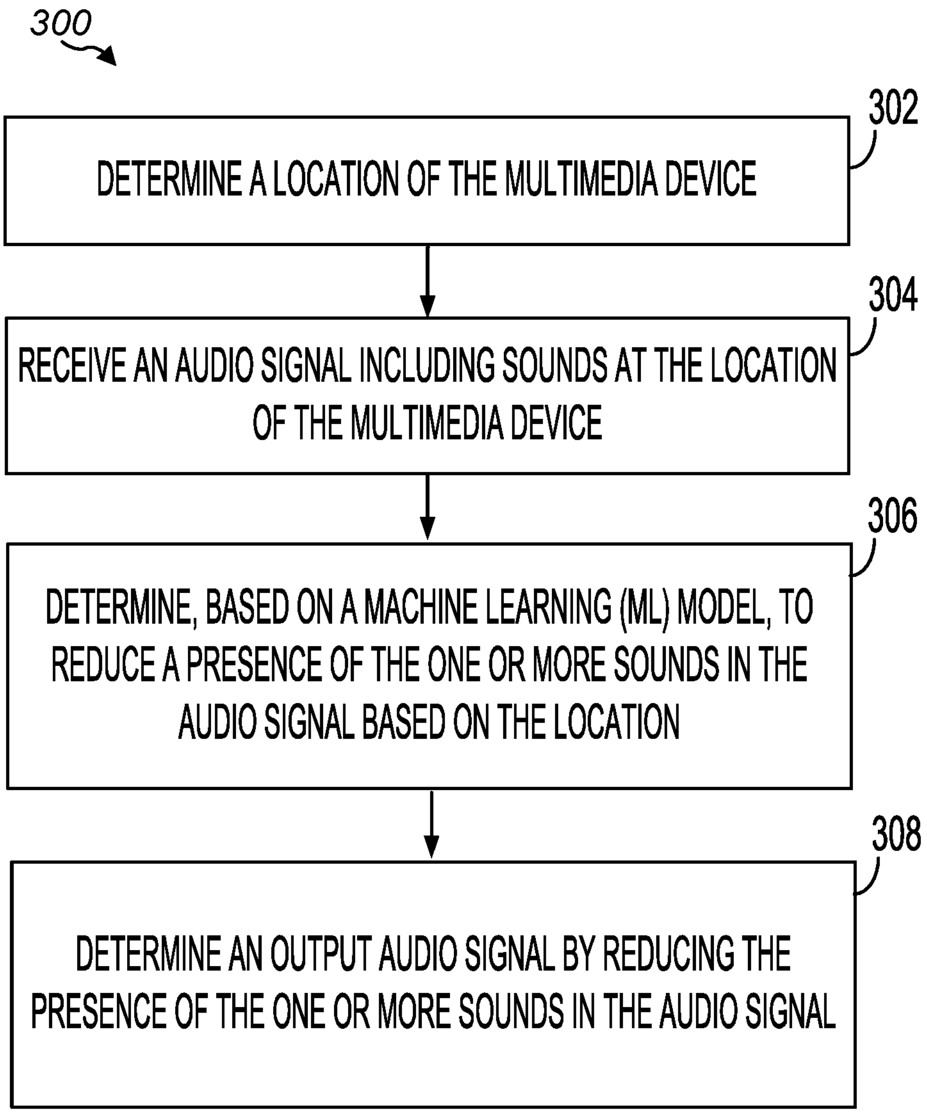
FIG. 3 shows a flow chart of an example method for machine learning (ML) model-based removal of ambient sounds based on location according to one or more aspects of this disclosure.

The multimedia device 200 of FIG. 2 may be configured to perform the operations described with reference to FIG. 3 to determine an audio signal. FIG. 3 shows a flow chart of an example method for machine learning (ML) model-based removal of ambient sounds based on location according to one or more aspects of this disclosure. The operations of FIG. 3 may result in an audio signal with improved representation of sounds, which results in an improved user experience. Each of the operations described with reference to FIG. 3 may be performed by one or a combination of the processors of the SoC 100.

At block 302, a location of the multimedia device is determined. The location may be determined from direct measurements of the device's location through a global navigation satellite system (GNSS) such as a global positioning system (GPS). The location may additionally or alternatively determined from contextual information, such as by detecting nearby wireless access points (APs) in a local area network (LAN), detecting cellular towers nearby in a wide area network (WAN), obtaining landmark information from a camera, and/or receiving location information from a current calendar event in the user's calendar.

At block 304, one or more audio signals are received. The audio data may be received, for example, from one or more microphones. The audio data may alternatively be received from a wireless microphone, in which the audio data is received through one or more of the WAN adaptor 152, the LAN adaptor 153, and/or the PAN adaptor 154. The audio data may alternatively be received from a memory location or a network storage location, such as when the audio signal was previously captured and is now retrieved from memory 106 and/or from a remote location through one or more of the WAN adaptor 152, the LAN adaptor 153, and/or the PAN adaptor 154. In some embodiments, the capture or retrieval of audio signals may be initiated by multimedia application 204 executing on the SoC 100. Audio data, comprising the audio signals, may be retrieved at block 302 and further processed by the SoC 100 according to the operations described in one or more of the following blocks.

At block 306, a machine learning (ML) model determines to reduce the presence of one or more sounds in the audio signal received at block 304 based on the location determined at block 302. The ML model may be trained to associate certain sounds with relevant locations. Thus, when the multimedia device is at a particular location the ML model determines certain sounds as relevant to the user and other sounds as not relevant to the user. For example, when the user is at a transit center the ML algorithm may be trained to recognize noises corresponding to notifications associated with the user's frequently-ridden route identifier and reduce the presence of notifications associated with other route identifiers. In another example, when the user is at a zoo exhibit featuring lions the ML algorithm may be trained to recognize noises from lions and reduce the presence of other animal noises.

At block 308, an output audio signal is determined by reducing the presence of the one or more sounds in the original audio signal. Reducing the presence of the one or more sounds may include reducing an amplitude of the sounds to reduce the impact of the sounds on the audio signal, shifting a frequency of the sounds to a less audible frequency to reduce the impact of the sounds on the audio signal, and/or cancelling the sounds by injecting an anti-noise signal (e.g., a reverse sound wave).

Additional actions may be taken in combination with the reduction of the presence of the undesired sounds. For example, the multimedia device may stop audio playback to output the output audio signal when the one or more relevant sounds are identified. In another example, the multimedia device may duck audio playback to output the output audio signal when the one or more relevant sounds are identified. In a further example, the multimedia device may generate a non-audio notification to the user corresponding to the route identifier. The non-audio notification may include a push notification or text message to the user. The non-audio notification may also or alternatively include a visual indicator such as a flashing light or blinking screen.

The operations described with reference to blocks 302, 304, and 306 of FIG. 3 may be performed on a digital signal processor (DSP), such as DSP 112 of the SoC 100 illustrated in FIG. 1. However, the operations may alternatively be performed by one or more of the processors of FIG. 1, including one or more of the CPU 104, the DSP 112, the GPU 126, or the NSP 124. For example, the CPU 104 may record audio signals from the microphone array 130 to memory 106 as part of the operations of block 302. The DSP 112 may then perform the operations of blocks 304 and 306 on the audio signals stored in memory 106, after which output signals determined by the DSP 112 may be stored in memory 106, output to audio circuitry 156 for reproduction, and/or transmitted to another device through one or more of the WAN 152, LAN 153, and/or PAN 154. In another example, the processor performing the operations of blocks 302, 304, and/or 306 may be dedicated logic circuitry for performing certain operations.

Figure 4:
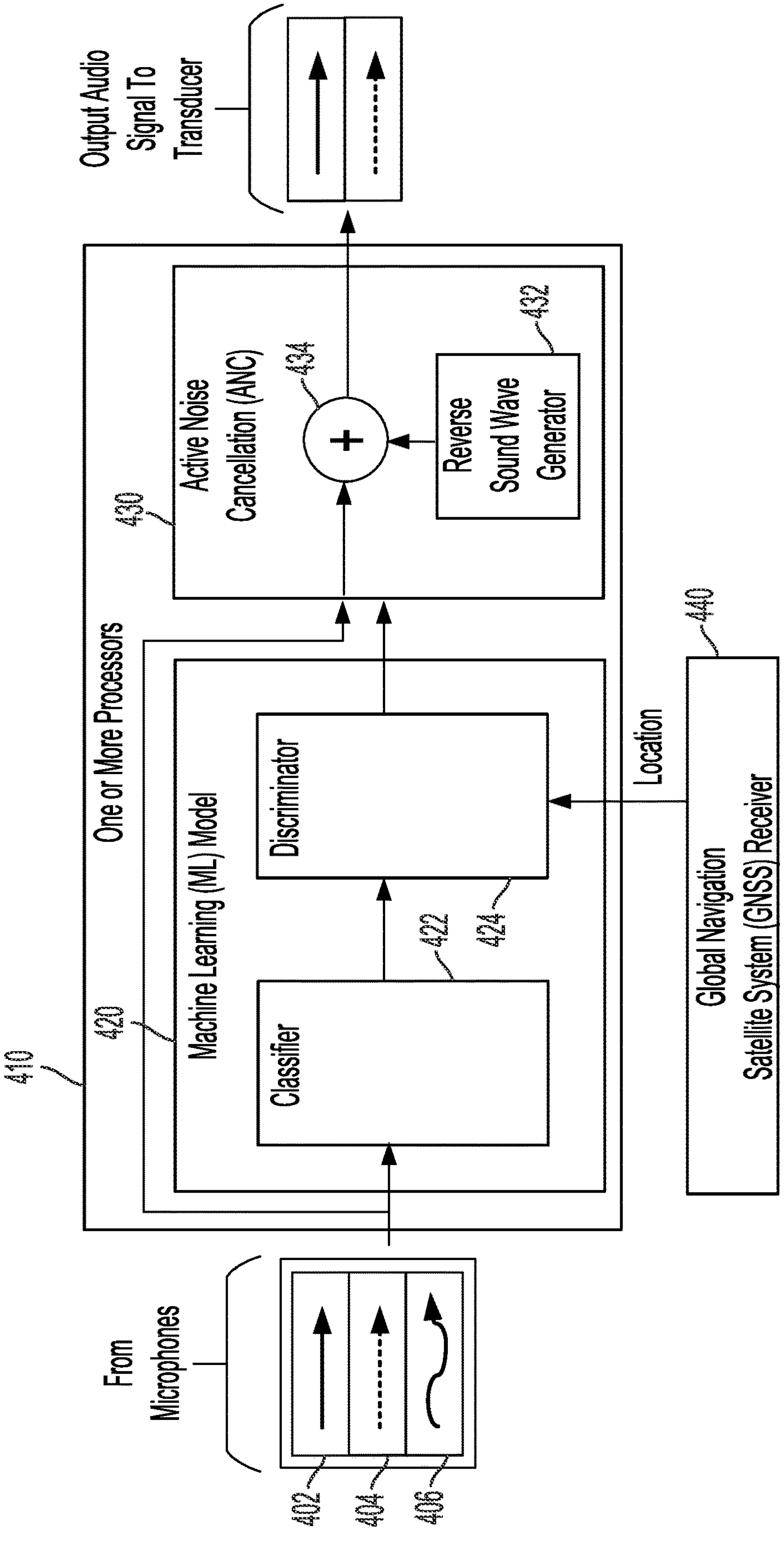
FIG. 4 is a block diagram illustrating an example configuration of one or more processors for audio signal processing with machine learning (ML) model-based removal of ambient sounds based on location according to one or more aspects of the disclosure.

Aspects of the signal processing described in FIG. 3 are applied in example devices, such as the example device of FIG. 4. FIG. 4 is a block diagram illustrating an example configuration of one or more processors for audio signal processing with machine learning (ML) model-based removal of ambient sounds based on location according to one or more aspects of the disclosure.

Processor 410 may receive input audio signals from microphones of the multimedia device. The input audio signals may include first sounds 402 corresponding to desired sounds, second sounds 404 corresponding to undesired sounds, and third sounds 406 corresponding to sounds to be preserved. The input audio signal to the processor 410 includes these three signals in combination, rather than as separate signals although separate signals are shown for illustration purposes. The input audio signal is provided to machine learning (ML) model 420. The ML model 420 may be trained to classify sounds and discriminate sounds. For example, ML model 420 may include classifier 422 that identifies individual sounds within the input audio signal.

The input audio signal may include zero or more sounds of each of the types of sounds 402, 404, and 406, and the classifier 422 operates on the input audio signal to classify the different sounds so that the sounds can be discriminated between. For example, the classifier 422 may classify a sound as a safety announcement by detecting the word "caution" in a speech pattern. As another example, the classifier 422 may classify a sound as a route announcement by detecting a route identifier number (e.g., "68") in a speech pattern.

After classifying each of the sounds, the discriminator 424 determines whether each sound is a desired sound or an undesired sound. For example, the discriminator 424 may determine whether a sound is a first type of sound 402, a second type of sound 404, or a third type of sound 406. The discriminator 424 uses location information about the multimedia device, which may be obtained from global navigation satellite system (GNSS) receiver 440. The discriminator 424 uses the location information to determine which sounds are relevant based on the location. For example, a sound classified as a route announcement for route identifier number 68 may be relevant when the user is at a transit center location near the user's house, but not relevant when the user is not at the user's usual transit center location.

The ML model 420 may output a control signal to active noise cancellation (ANC) 430 to reduce the presence of sounds determined by the discriminator 424 to be undesirable sounds. The ANC 430 may also receive the input audio signal and perform cancellation in parallel with the operation of the ML model 420. The ANC 430 may generate with reverse sound wave generator 432 an anti-noise signal corresponding to the sound identified as undesirable by the ML model 420. That anti-noise signal is combined with the input audio signal by summer 434 to produce an output audio signal in which the undesirable sound is removed or less audible. In some embodiments, the ANC 430 may execute on a second processor separate from the ML model 420, in which the second processor is an application specific integrated circuit (ASIC) configured to perform active noise cancellation (ANC) based one or more microphones.

In some embodiments, the processor 410 includes one or more processors performing different functionality illustrated in FIG. 4. For example, the ML model 420 may be executed by NSP 124 and the ANC 430 may be executed by DSP 112. As another example, the ML model 420 may be executed by GPU 126 and the ANC 430 may be executed by DSP 112. In some embodiments, the different components performing the different functionality may be included on a single SoC 100. The functionality may also be performed by a single component, such as with the DSP 112 executing the ML model 420 and the ANC 430.

Figure 5:
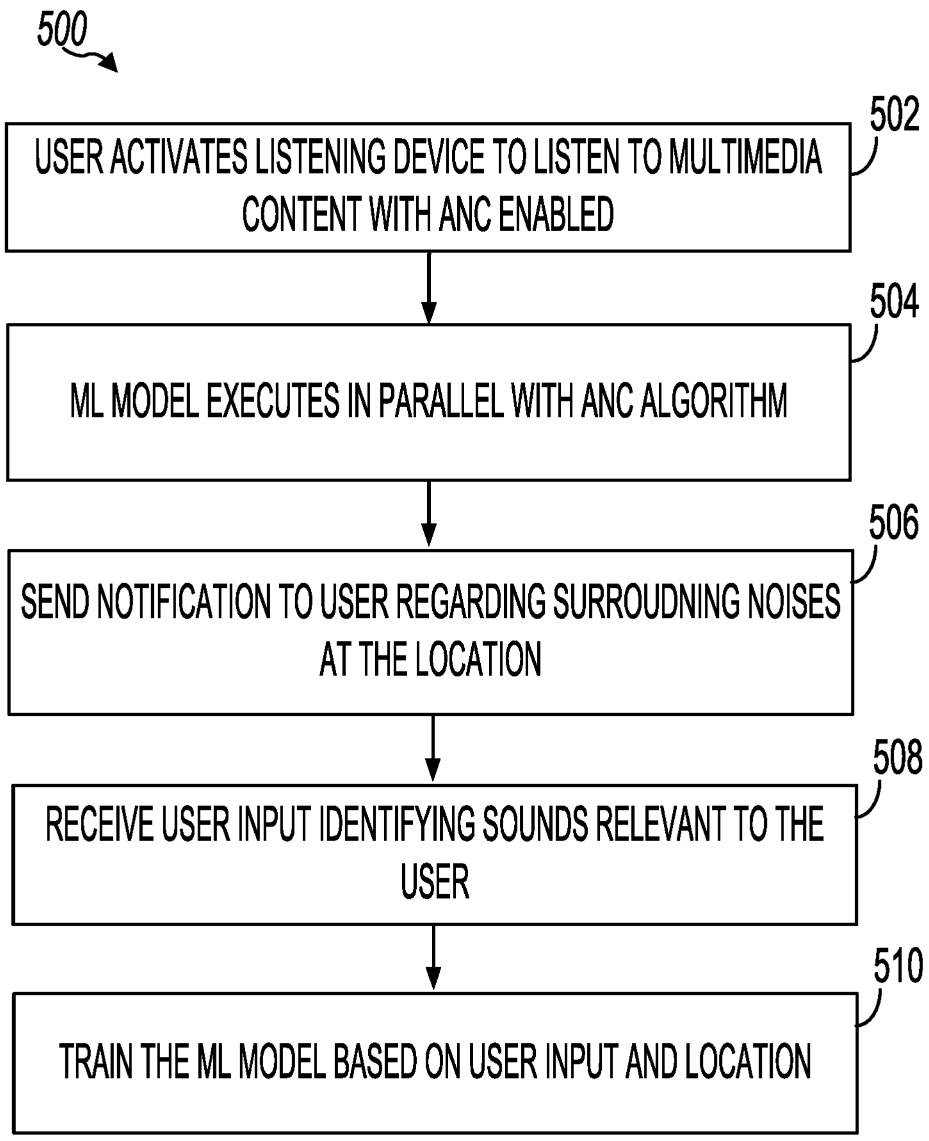
FIG. 5 shows a flow chart of an example method for training a machine learning (ML) model for removal of ambient sounds based on location according to one or more aspects of this disclosure.

The ML model 420 may be trained through user input to identify relevant and not relevant sounds at each location. An example training process is shown in FIG. 5. FIG. 5 shows a flow chart of an example method for training a machine learning (ML) model for removal of ambient sounds based on location according to one or more aspects of this disclosure. A method 500 includes, at block 502, the user activating a listening device, such as headphones, earpods, or a speaker, to listen to multimedia content with ANC enabled. This may include, for example, the user watching a movie, watching a TV show, streaming a video from the Internet, and/or listening to music. At block 504, the ML algorithm for classifying sounds executes in parallel with the ANC algorithm.

Figure 6:
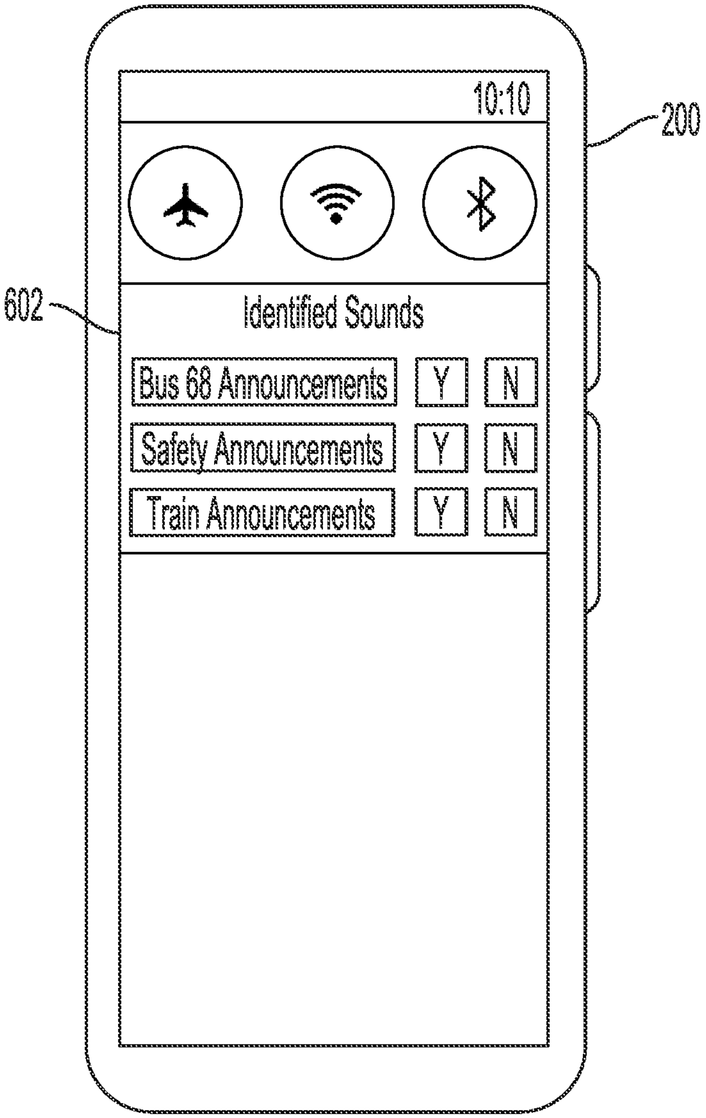
FIG. 6 is an example multimedia device requesting user input for training a machine learning (ML) model-based removal of ambient sounds based on location according to one or more aspects of this disclosure.

At block 506, the classified sounds of surrounding noises at the user's location are presented to the user in a notification. At block 508, user input is received providing an indication as to whether certain sounds are relevant to the user or not. An example of the training process is shown in FIG. 6. FIG. 6 is an example multimedia device requesting user input for training a machine learning (ML) model-based removal of ambient sounds based on location according to one or more aspects of this disclosure. The multimedia device 200 displays a notification to the user regarding identified sounds 602. The identification may include a description of the sound or a transcription of a portion of the sound. For example, the notification may include an identifier of "Bus 68 Announcements" for a sound classified as a route announcement and a transcription of the announcement including the number "68." The user may then identify with a "Y" or "N" whether the sound is relevant to the user.

At block 510, the ML model is trained using the user input and the location. Through training, the ML model may identify a particular sound as relevant to the user at a particular location. The trained ML model may subsequently determine when the sound is detected while the user is at the location that the sound is relevant to the user and the sound allowed to pass through to the output audio signal that the user hears. In the transit center example, the ML model may be trained through user input to know that at a particular transit center notifications regarding route "68" but not route "122" should be allowed through to the output audio signal. Other sounds, including those identified by the user as not relevant to the user at a particular location, may be reduced in the output audio signal through ANC.

Certain aspects and techniques as described herein may be implemented, at least in part, using an artificial intelligence (AI) program, e.g., a program that includes a machine learning (ML) model. For example, the machine learning model(s) 206 may implement an AI program as described with reference to FIG. 7. The ML model may be trained offline to receive an input and to determine sounds in the input audio signal relevant to the user based on the location.

An example ML model may define computing capabilities for making determinations from input data, with the determinations made based on patterns identified in the input data. The computing capabilities may be defined in terms of weights and biases. Weights may indicate relationships between certain input data and certain determinations. Biases may indicate a starting point for determinations. An example ML model operating on input data may start at a determination defined by the biases and then change its determination based on a combination of the input data and the weights. The determinations from an ML model may be one or more of decisions, predictions, inferences, or values. The decisions, predictions, or inferences may be represented as values output from an ML model. In some embodiments of this disclosure, an ML model may be configured to provide computing capabilities for feedback cancellation in audio signal processing. Such an ML model may be configured with weights and/or biases to perform feedback cancellation by recognizing desirable aspects of audio (e.g., speech and environmental sounds) and reducing or eliminating undesirable aspects of audio (e.g., feedback artifacts). Thus, during operation of a device, the ML model may receive input data (e.g., microphone signals) and make determinations (e.g., output audio signals with reduced feedback artifacts) based on the weights and/or biases. ML models that may be configured in this manner according to embodiments of this disclosure include supervised ML models and unsupervised ML models and ML models for classification and/or regression.

The description herein illustrates, by way of some examples, how one or more tasks/problems in feedback cancellation in audio signal processing may benefit from the application of one or more ML models using an ANN. In some embodiments, other type(s) of ML models may be used instead of an ANN. Hence, unless expressly recited, subject matter regarding an ML model is not necessarily intended to be limited to an ANN solution. Further, it should be understood that, unless otherwise specifically stated, terms such "AI/ML model," "ML model," "trained ML model," "ANN," "model," "algorithm," or the like are intended to be interchangeable.

Figure 7:
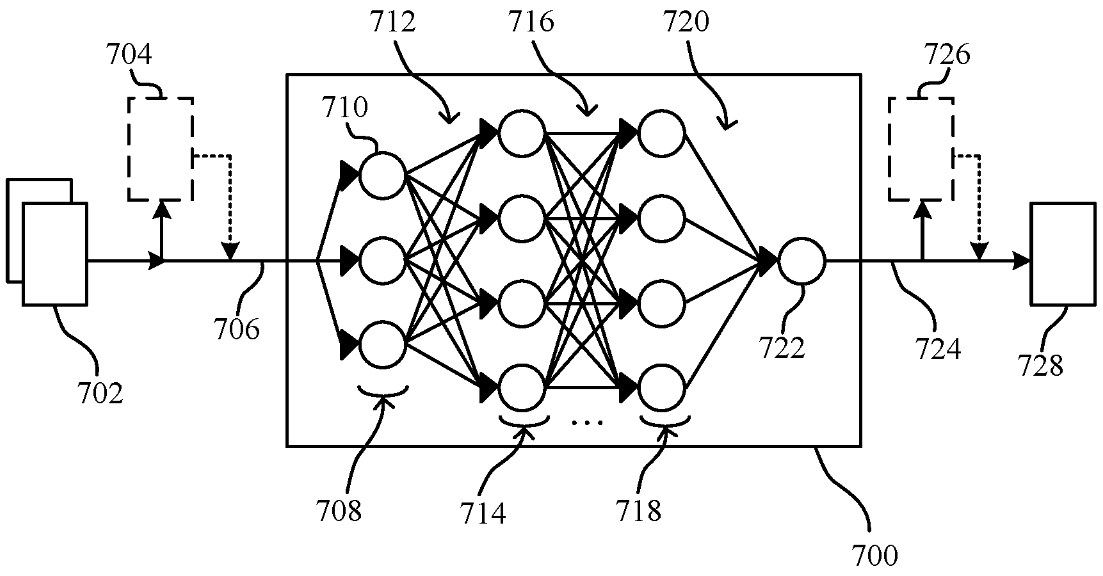
FIG. 7 is an illustrative block diagram of an example machine learning (ML) model represented by an artificial neural network (ANN) according to some embodiments of the disclosure.

FIG. 7 is an illustrative block diagram of an example machine learning (ML) model represented by an artificial neural network (ANN) 700. ANN 700 may receive input data 706 which may include one or more bits of data 702, pre-processed data output from pre-processor 704 (optional), or some combination thereof. Here, data 702 may include training data, verification data, application-related data, or the like, e.g., depending on the stage of deployment of ANN 700. Pre-processor 704 may be included within ANN 700 in some other implementations. Pre-processor 704 may, for example, process all or a portion of data 702 which may result in some of data 702 being changed, replaced, deleted, etc. In some implementations, pre-processor 704 may add additional data to data 702. In some implementations, the pre-processor 704 may be a ML model, such as an ANN.

ANN 700 includes at least one first layer 708 of artificial neurons 710 to process input data 706 and provide resulting first layer data via edges 712 to at least a portion of at least one second layer 714. Second layer 714 processes data received via edges 712 and provides second layer output data via edges 716 to at least a portion of at least one third layer 718. Third layer 718 processes data received via edges 716 and provides third layer output data via edges 720 to at least a portion of a final layer 722 including one or more neurons to provide output data 724. All or part of output data 724 may be further processed in some manner by (optional) post-processor 726. Thus, in certain examples, ANN 700 may provide output data 728 that is based on output data 724, post-processed data output from post-processor 726, or some combination thereof. Post-processor 726 may be included within ANN 700 in some other implementations. Post-processor 726 may, for example, process all or a portion of output data 724 which may result in output data 728 being different, at least in part, to output data 724, e.g., as result of data being changed, replaced, deleted, etc. In some implementations, post-processor 726 may be configured to add additional data to output data 724. In this example, second layer 714 and third layer 718 represent intermediate or hidden layers that may be arranged in a hierarchical or other like structure. Although not explicitly shown, there may be one or more further intermediate layers between the second layer 714 and the third layer 718. In some implementations, the post-processor 726 may be a ML model, such as an ANN.

ANN 700 or other ML models may be implemented in various types of processing circuits along with memory and applicable instructions therein. For example, general-purpose hardware circuits, such as, such as one or more central processing units (CPUs) and one or more graphics processing units (GPUs) may be employed to implement a model. One or more tensor processing units (TPUs), neural processing units (NPUs), or other special-purpose processors, and/or field-programmable gate arrays (FPGAs), application-specific integrated circuits (ASICs), or the like also or alternatively may be employed. In some implementations, the ML model may be implemented by a NPU and/or a TPU embedded in a system on chip (SoC) along with other components, such as one or more CPUs and/or GPUs. A SoC includes several components manufactured on a shared semiconductor substrate. The NPU and/or TPU may be controlled by the one or more CPUs by configuring the ML model implemented by the NPU and/or TPU with weights and/or biases, providing certain training data to the ML model to configure the ML model, and/or providing input data to the ML model to obtain determinations. The one or more CPUs may also receive the determinations and be configured to perform certain actions based on the determinations made by the ML model.

In one or more aspects, techniques for supporting signal processing may include additional aspects, such as any single aspect or any combination of aspects described below or in connection with one or more other processes or devices described elsewhere herein. In a first aspect, supporting signal processing may include an apparatus configured to process audio signals using one or more processors. The apparatus is further configured to determine a location of a multimedia device; receive the audio signal including sounds at the location of the apparatus; determine, based on a machine learning (ML) model, to reduce a presence of one or more sounds in the audio signal based on the location; and determine an output audio signal by reducing the presence of the one or more sounds in the audio signal.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the one or more processors are configured to determine a classification of one or more sounds in the audio signal; and receive user input specifying whether to cancel sounds identified with the classification when the sounds are present in the audio signal recorded at the location, wherein the machine learning (ML) model is trained with the user input, the classification, and the location to determine whether to reduce the presence of sounds determined to match the classification at the location.

In a third aspect, in combination with one or more of the first aspect or the second aspect, the output audio signal is determined by reverse sound wave generation for the one or more sounds.

In a fourth aspect, in combination with one or more of the first aspect through the third aspect, the one or more processors comprise a first processor configured to execute the machine learning (ML) model and a second processor configured to generate a reverse sound wave corresponding to the one or more sounds and patch the reverse sound wave with the audio signal.

In a fifth aspect, in combination with one or more of the first aspect through the fourth aspect, the one or more processors are configured to stop audio playback to output the output audio signal when the one or more sounds are received by the apparatus.

In a sixth aspect, in combination with one or more of the first aspect through the fifth aspect, the location is determined to be a transit center, and the machine learning (ML) model determines to reduce the presence of the one or more sounds based on the one or more sounds corresponding to a route identifier associated with a route not relevant to a user.

In a seventh aspect, in combination with one or more of the first aspect through the sixth aspect, the machine learning (ML) model determines not to reduce the presence of the one or more sounds based on the one or more sounds corresponding to a route identifier associated with a route relevant to the user, and the one or more processors are configured to generate a non-audio notification to the user corresponding to the route identifier.

In an eighth aspect, in combination with one or more of the first aspect through the seventh aspect, the machine learning (ML) model is trained based on user input to identify sounds that when detected at the location correspond to the route identifier associated with a route not relevant to the user.

In a ninth aspect, in combination with one or more of the first aspect through the eighth aspect, the apparatus further includes a satellite receiver coupled to the one or more processors, wherein the location is determined based on a global navigation satellite system (GNSS) signal received by the satellite receiver.

In a tenth aspect, in combination with one or more of the first aspect through the ninth aspect, the apparatus further includes at least one microphone coupled to the one or more processors, wherein the audio signal is recorded by the at least one microphone.

In an eleventh aspect, in combination with one or more of the first aspect through the tenth aspect, the one or more processors are configured to perform active noise cancellation (ANC) on the audio signal to determine the audio output signal.

In a twelfth aspect, in combination with one or more of the first aspect through the eleventh aspect, the one or more processors include a first processor configured to execute the machine learning (ML) model and include a second processor configured to generate a reverse sound wave corresponding to the one or more sounds and patch the reverse sound wave with the audio signal.

In a thirteenth aspect, in combination with one or more of the first aspect through the twelfth aspect, the second processor is an application specific integrated circuit (ASIC) configured to perform active noise cancellation (ANC) based on the first microphone and the second microphone.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions using terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices. The use of different terms referring to actions or processes of a computer system does not necessarily indicate different operations. For example, "determining" data may refer to "generating" data. As another example, "determining" data may refer to "retrieving" data.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 3 may be combined with one or more blocks (or operations) described with reference to another of the figures. For example, one or more blocks (or operations) of FIG. 3 may be combined with one or more blocks (or operations) of FIG. 1 or FIG. 2. As another example, one or more blocks associated with FIG. 4 or FIG. 5 may be combined with one or more blocks (or operations) associated with FIGS. 1-3. As a further example, one or more blocks associated with FIG. 7 may be combined with one or more blocks (or operations) associated with FIGS. 3-6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

In one or more aspects, the operations described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

The operations of a method or algorithm disclosed herein may be implemented in a processor-executable software module which may reside on a computer-readable medium and commercially made available as a computer program product as software. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc wherein disks usually reproduce data magnetically and discs reproduce data optically with lasers. Combinations of the above should also be included within the scope of computer-readable media.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward," or "left" and "right" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
a memory configured to store an audio signal; and
one or more processors coupled to the memory, the one or more processors configured to:
determine a location of the apparatus;
receive the audio signal including sounds at the location of the apparatus;
determine, based on a machine learning (ML) model, to reduce a presence of one or more sounds in the audio signal based on the location; and
determine an output audio signal by reducing the presence of the one or more sounds in the audio signal.

2. The apparatus of claim 1, wherein the one or more processors are configured to:
determine a classification of one or more sounds in the audio signal; and
receive user input specifying whether to cancel sounds identified with the classification when the sounds are present in the audio signal recorded at the location,
wherein the machine learning (ML) model is trained with the user input, the classification, and the location to determine whether to reduce the presence of sounds determined to match the classification at the location.

3. The apparatus of claim 1, wherein the output audio signal is determined by reverse sound wave generation for the one or more sounds.

4. The apparatus of claim 3, wherein the one or more processors comprise a first processor configured to execute the machine learning (ML) model and a second processor configured to generate a reverse sound wave corresponding to the one or more sounds and patch the reverse sound wave with the audio signal.

5. The apparatus of claim 1, wherein the one or more processors are configured to:
stop audio playback to output the output audio signal when the one or more sounds are received by the apparatus.

6. The apparatus of claim 1, wherein:
the location is determined to be a transit center; and
the machine learning (ML) model determines to reduce the presence of the one or more sounds based on the one or more sounds corresponding to a route identifier associated with a route not relevant to a user.

7. The apparatus of claim 6, wherein:
the machine learning (ML) model determines not to reduce the presence of the one or more sounds based on the one or more sounds corresponding to a route identifier associated with a route relevant to the user; and
the one or more processors are configured to:
generate a non-audio notification to the user corresponding to the route identifier.

8. The apparatus of claim 7, wherein:
the machine learning (ML) model is trained based on user input to identify sounds that when detected at the location correspond to the route identifier associated with a route not relevant to the user.

9. The apparatus of claim 1, further comprising a satellite receiver coupled to the one or more processors, wherein the location is determined based on a global navigation satellite system (GNSS) signal received by the satellite receiver.

10. The apparatus of claim 1, further comprising at least one microphone coupled to the one or more processors, wherein the audio signal is recorded by the at least one microphone.

11. The apparatus of claim 1, wherein the one or more processors are configured to perform active noise cancellation (ANC) on the audio signal to determine the audio output signal.

12. A method, comprising:
determining a location of a multimedia device;
receiving an audio signal including sounds at the location of the multimedia device;
determining, based on a machine learning (ML) model, to reduce a presence of one or more sounds in the audio signal based on the location; and
determining an output audio signal by reducing the presence of the one or more sounds in the audio signal.

13. The method of claim 12, wherein determining to reduce the presence of the one or more sounds comprises:
determining a classification of the one or more sounds in the audio signal; and
receiving user input specifying whether to cancel sounds identified with the classification when the one or more sounds are present in the audio signal recorded at the location,
wherein the machine learning (ML) model is trained with the user input, the classification, and the location to determine whether to reduce the presence of sounds determined to match the classification at the location.

14. The method of claim 12, wherein the output audio signal is determined by reverse sound wave generation for the one or more sounds.

15. The method of claim 14, wherein a first processor executes the machine learning (ML) model and a second processor generates a reverse sound wave corresponding to the one or more sounds and patches the reverse sound wave with the audio signal.

16. A multimedia device, comprising:
a first microphone and a second microphone;
a global navigation satellite system (GNSS) receiver;
a memory configured to store an audio signal; and
one or more processors coupled to the memory, to the first microphone, to the second microphone, and to the GNSS receiver,
the one or more processors configured to:
determine a location of the multimedia device based on the GNSS receiver;
receive the audio signal from the first microphone, the audio signal including sounds at the location;

determine, based on a machine learning (ML) model, to reduce a presence of one or more sounds in the audio signal based on the location; and determine an output audio signal by reducing the presence of the one or more sounds in the audio signal.

17. The multimedia device of claim 16, wherein the one or more processors are configured to:

determine a classification of one or more sounds in the audio signal; and receive user input specifying whether to cancel sounds identified with the classification when the sounds are present in the audio signal recorded at the location, wherein the machine learning (ML) model is trained with the user input, the classification, and the location to determine whether to reduce the presence of sounds determined to match the classification at the location.

18. The multimedia device of claim 16, wherein the one or more processors include a first processor configured to execute the machine learning (ML) model and include a second processor configured to generate a reverse sound wave corresponding to the one or more sounds and patch the reverse sound wave with the audio signal.

19. The multimedia device of claim 18, wherein the second processor is an application specific integrated circuit (ASIC) configured to perform active noise cancellation (ANC) based on the first microphone and the second microphone.

20. The multimedia device of claim 16, wherein:

the location is determined to be a transit center; and the machine learning (ML) model is configured to determine to reduce the presence of the one or more sounds based on the one or more sounds corresponding to a route identifier associated with a route not relevant to a user.

* * * * *